US009210625B1

(12) United States Patent
Lovlekar et al.

(10) Patent No.: US 9,210,625 B1
(45) Date of Patent: Dec. 8, 2015

(54) SYSTEMS AND METHODS FOR MANAGING NETWORK CONNECTIONS

(71) Applicant: Amazon Technologies, Inc., Seattle, WA (US)

(72) Inventors: Srirang Ashok Lovlekar, Cupertino, CA (US); Kiran Kumar Edara, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/695,801

(22) Filed: Apr. 24, 2015

(51) Int. Cl.
*H04W 4/00* (2009.01)
*H04W 36/00* (2009.01)
*H04W 24/08* (2009.01)
*H04W 24/10* (2009.01)
*H04W 36/30* (2009.01)

(52) U.S. Cl.
CPC .......... *H04W 36/0066* (2013.01); *H04W 24/08* (2013.01); *H04W 24/10* (2013.01); *H04W 36/0088* (2013.01); *H04W 36/30* (2013.01)

(58) Field of Classification Search
CPC ......... H04L 2012/5608; H04W 84/12; H04W 88/08; H04W 80/04; H04W 88/06; H04W 84/18; H04W 36/30; H04W 36/24; H04W 36/0066; H04W 24/10; H04W 24/08
USPC ........................ 370/310.2, 328, 332, 338, 349
See application file for complete search history.

(56) References Cited

U.S. PATENT DOCUMENTS

| | | | | |
|---|---|---|---|---|
| 7,610,014 B2 * | 10/2009 | Buckley | ................ | 455/41.2 |
| 7,610,057 B2 * | 10/2009 | Bahl et al. | .................. | 455/522 |
| 7,623,486 B2 * | 11/2009 | Caldwell et al. | .............. | 370/328 |
| 7,986,948 B2 * | 7/2011 | Jain et al. | ................ | 455/436 |
| 8,599,699 B2 * | 12/2013 | Hirano et al. | ................. | 370/239 |
| 2005/0233700 A1 * | 10/2005 | Pecen et al. | ............... | 455/67.11 |
| 2012/0258733 A1 * | 10/2012 | Fischer et al. | .............. | 455/456.1 |

* cited by examiner

*Primary Examiner* — Brenda H Pham
(74) *Attorney, Agent, or Firm* — Sutherland Asbill & Brennan LLP

(57) ABSTRACT

Provided are systems and methods for establishing, by a user device, a connection with a cellular network, transmitting, by the user device to a cellular network server, a first message comprising an indication of a connection to a wireless network, receiving, by the user device from the cellular network server, a second message comprising wireless network measurement parameters, acquiring, by the user device from the cellular phone device, wireless network measurements in accordance with the wireless network measurement parameters, and transmitting, by the user device to the cellular network server, a wireless network measurement report comprising an indication of the wireless network measurements, wherein the cellular network server is configured to determine whether a cellular device is proximate to an access point for the wireless network using the wireless network measurements.

20 Claims, 9 Drawing Sheets

| Serving Cell (SCELL) ID and measurements | Neighbor Cell (NCELL) ID and measurements | WiFi Access Point (AP) ID and measurements | Geo Location | Timestamp |
|---|---|---|---|---|
| EUTRAN cell PCI 100, RSRP=-90dBm, RSRQ=-20dB | EUTRAN cell PCI 200, RSRP=-100dBm, RSRQ=-24dB | SSID=Guest, BSSID=9c:1c:12:15:1e:8a, RSSI=-100dBm | 37.7833° N, 122.4167° W | 2015.12.03_8:00:00am |
| UTRAN cell PSC=256, RSCP=-85dBm, Ec/No=-19dB | UTRAN cell PSC=321, RSCP=-105dBm, Ec/No=-23dB | SSID=myhome, BSSID=9c:4c:d2:15:1e:8d, RSSI=-80dBm | 37.7843° N, 122.4157° W | 2015.12.03_8:00:05am |

FIG. 3

SYSTEMS AND METHODS FOR MANAGING NETWORK CONNECTIONS

BACKGROUND

Many electronic communication devices have the ability to communicate via different types of communication networks. For example, some cellular phones, such as smart phones, can communicate via cellular networks and wireless local area networks, such as WiFi networks. In some instances, these types of devices can switch between the different types of networks during use. For example, a cellular phone may connect to a WiFi network to transfer data when a reliable WiFi network connection is available, and connect to a cellular network to transfer data when a reliable WiFi network connection is not available. This can improve service and can help to avoid, or at least minimize, data usage or fees that are often associated with transferring data over a cellular network. Although, a switch between networks can be done automatically, there are often delays associated with making the switch.

BRIEF DESCRIPTION OF THE DRAWINGS

FIG. 3 is a table that illustrates contents of an example network measurements log in accordance with one or more embodiments.

Figure 1A:
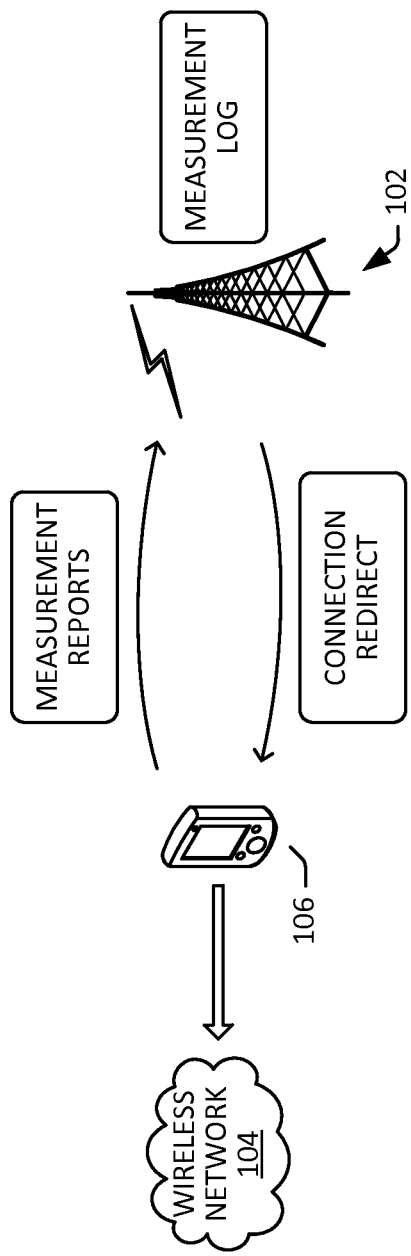
FIGS. 1A and 1B are diagrams that illustrate example network communication environments in accordance with one or more embodiments.

While this disclosure is susceptible to various modifications and alternative forms, specific embodiments thereof are shown by way of example in the drawings and will be described in detail herein. The drawings may not be to scale. It should be understood, however, that the drawings and the detailed description thereto are not intended to limit the disclosure to the particular form disclosed, but to the contrary, the intention is to cover all modifications, equivalents, and alternatives falling within the spirit and scope of the present disclosure as defined by the appended claims.

DETAILED DESCRIPTION

Described herein are systems and methods for managing network connections. Certain embodiments described herein facilitate user equipment (UE), such as a cellular phone, establishing connections with radio access networks (RAN), such as cellular networks, and non-RANs, such as WiFi networks, and switching between the various networks.

In some instances, a UE, such as a cellular phone, can be used to communicate via a cellular network, and other types of wireless networks, such as WiFi networks. Unfortunately, the switching between the networks can be delayed, causing the UE to remain connected to one network, such as the cellular network, despite the fact that a more favorable network may be available, such as a WiFi network that has better performance or does not include fees or other costs associated with transferring data across the cellular network. For example, in one instance, a user of a cellular phone may be located in a cell of a cellular network and the user's cellular phone may be connected to a cell of a base station (or cell tower) for the cell. As the user and the phone move into range of a WiFi network, it may be desirable for the phone to switch its connection quickly to the WiFi network (e.g., via a wireless access point (AP) of the WiFi network) so that it can begin to communicate data via the WiFi network as soon as possible. Conversely if the user and the phone move out of range of the WiFi network, then it may be desirable for the phone to switch its connection quickly back to the cellular network to maintain a reliable data connection, as opposed to setting up a connection with the cellular network after the WiFi connection fails or otherwise becomes unreliable. Such a process may provide an uninterrupted and optimal data and/or voice connectivity experience to the user.

Referring specifically to cellular networks, for example, since a macro cell in a cellular network can provide coverage for an area of radius as large as 5 to 10 kilometers (Km), it is very difficult to rely on the identity of a cell where the UE is located (or "camped on") to trigger a WiFi scan. For example, even if an Access Network Discovery and Selection Function (ANDSF) and Management Object (MO) indicates that a WiFi network is in the vicinity of a particular Evolved Universal Mobile Telecommunications System Terrestrial Radio Access Network (EUTRAN) cell with an EUTRAN Cell Global Identity (ECGI) of ABCD, for instance, it may not be efficient for the UE to start a discovery (or "scanning") for the WiFi network when the UE enters the coverage area of the cell with the ECGI of ABCD. This is because, despite the UE being in an area associated with the cell, the UE can still be several kilometers away from the WiFi AP. That is, the cell is so large, that just being in the cell may not guarantee that the UE is near a WiFi AP in the cell. Moreover, since WiFi coverage area can very small relative to the area of the cell, the UE may never be in the WiFi coverage area, and can waste resources scanning for a WiFi network that, despite being in the same cell as the UE, may never be near the UE. Unfortunately, such premature scanning can result in higher power consumption due to, for example, the UE conducting repeated scanning for a WiFi network that is in the same cell, but out of range.

Embodiments described herein can provide for switching a UE data connection from a cellular network to a WiFi network and/or vice versa. For example, embodiments can provide for relatively fast switching from a cellular network to a WiFi network when the UE is moving into the WiFi network's coverage area. As a further example, embodiments can provide for relatively fast switching from a WiFi network to a cellular network when the UE is moving out of the WiFi network's coverage area.

As depicted in FIG. 1A, a network communication environment 100 can include a cellular network 102, one or more wireless networks 104 (e.g., WiFi networks), and/or one or more pieces of user equipment (UEs) 106, such as one or more cellular phones or other portable electronic devices. As described herein, in some embodiments, a UE 106 can collect various measurements regarding its environment during use, such as measurements of the strengths of cellular signals (from a serving cell and/or neighboring cells) and/or the WiFi signals at the UE 106, and the UE 106 can provide some or all of those measurements to the cellular network 102 via one or more measurement reports. The cellular network 102 can use the measurement reports from the UE 106 and other measurement reports from any number of other UEs 106 to generate a measurement log. Each entry of the log can include, for example, a listing of cellular signals strengths and/or WiFi signals strengths measured at a given geographic location by a UE 106. When a UE 106 is disconnected from a WiFi network, the UE 106 may inform the cellular network 102, and continue to send measurement reports to the cellular network 102 that include at least the strengths of cellular signals at the UE 106. The cellular network 102 can monitor the measurement reports received from the UE 106 and compare them to the entries of the measurement log. If the cellular network 102 determines that the cellular signal strengths (or other information) in a measurement report from a UE 106 matches (e.g., fall within range of) the cellular signal strengths (or other information) of an entry of the log, the cellular network 102 may identify the WiFi network 104 associated with the entry, and transmit a redirect request to the UE 106 informing the UE 106 of the WiFi networks proximity to the UE 106 and/or instructing the UE106 to attempt to connect to the WiFi network 104. The UE 106 may, in turn, scan for the WiFi network 104 and establish a connection to an access point of the WiFi network 104. Thus, the cellular network 102 can assist the UE 106 in locating nearby WiFi networks 104.

Although certain embodiments are described with regard to cellular networks and WiFi networks for the purpose of illustration, the techniques described herein can be applied to any suitable technology, such as other types of wireless and radio access networks. Moreover, although certain embodiments are described with regard to a UE providing cellular measurement data to a cellular network via a cellular connection with the network, the UE may provide the cellular measurement data and other data to the cellular network in any suitable form of communication, such as internet protocol (IP) messaging. For example, the UE may transfer cellular measurement data and other data to a server using internet protocol (IP) messages (e.g., via a wired or wireless (WiFi) connection to an AP of the network), and the server may route the (IP) messages (and/or the data contained therein) to the cellular network (e.g., to a base station controller of the cellular network).

Figure 1B:
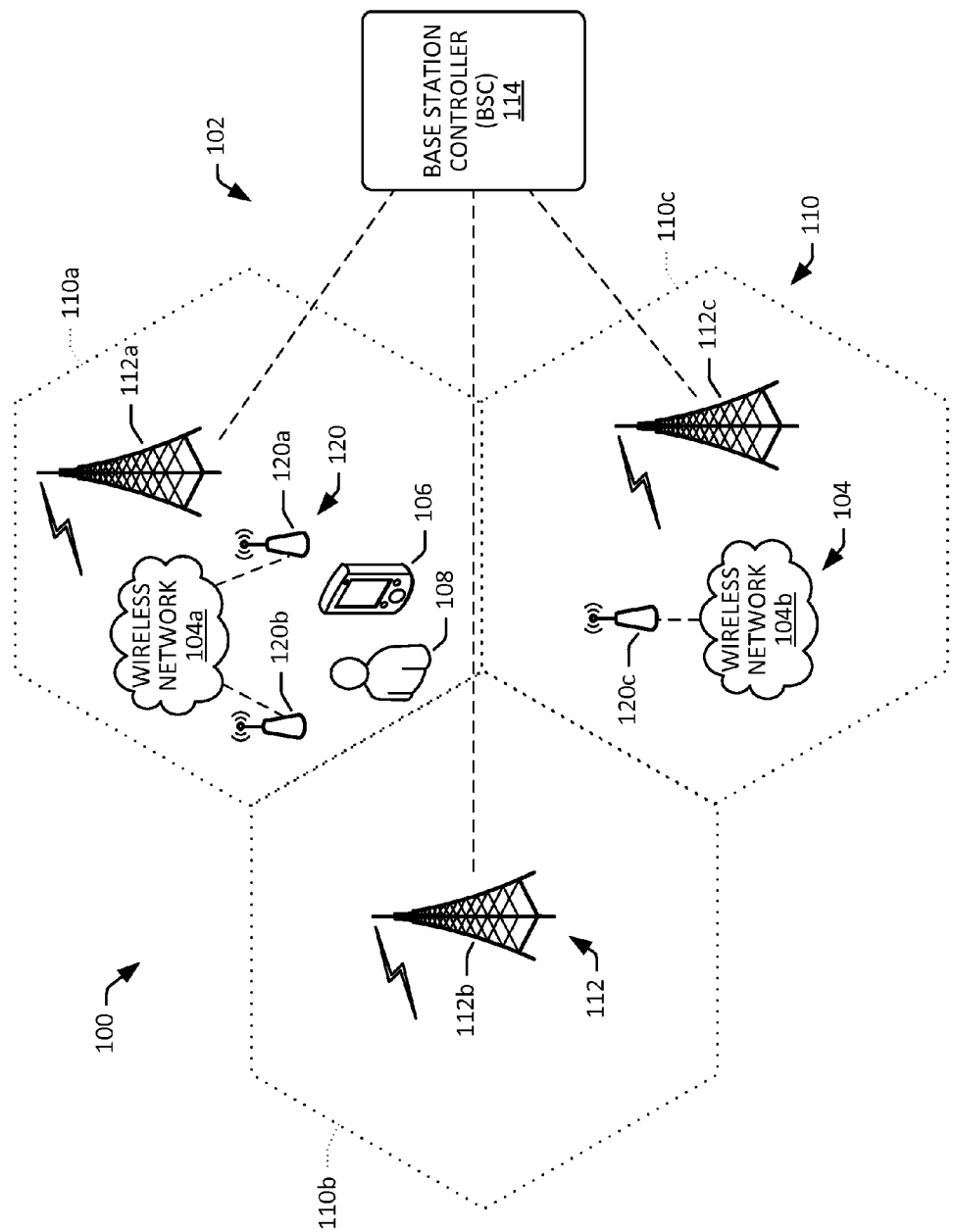

FIG. 1B is a diagram that illustrates an example network communication environment ("environment") 100 in accordance with one or more embodiments. The environment 100 can include a cellular network 102, one or more wireless networks 104 (e.g., wireless networks 104a and 104b), and/or one or more pieces of user equipment (UE) 106, such as one or more cellular phones or other portable electronic devices. A UE 106 may be employed by a user 108 to communicate over the cellular network 102 and/or one or more of the wireless networks 104. For example, if the UE 106 is a cellular phone, the user 108 may use the phone to make voice calls on the cellular network 102, and/or the user 108 may use the phone to access network data content, such as Internet webpages, music files, and/or the like via the cellular network 102 and/or one or more of the wireless networks 104. Although only two wireless networks 104 are illustrated for the purpose of illustration, embodiments can include any number of wireless networks 104. Further, although only a single cellular network 102 is illustrated for the purpose of illustration, embodiments can include any number of cellular networks 102.

The cellular network 102 may include a wireless network distributed over land areas called cells 110 (e.g., cells 110a, 110b, and 110c). Each of the cells 110 may be served by at least one fixed-location radio base station (RBS) 112 (e.g., RBS 112a, RBS 112b, and RBS 112c, respectively). An RBS 112 may include a transceiver, and can also be referred to as a "base station," a "cell site" or a "cell tower." The base station(s) 112 for a cell 110 may use a different set of frequencies from those of neighboring cells 110, to avoid interference and to provide sufficient bandwidth within the cell 110. The illustrated embodiment depicts three cells 110 (e.g., cells 110a, 110b, and 110c) of the cellular network 102 that are serviced by respective base stations 112 (e.g., base stations 112a, 112b, and 112c). Thus, for example, the first base station 112a may operate at a first frequency to service UEs 106 located in or around the corresponding first cell 110a, the second base station 112b may operate at a second frequency to service UEs 106 located in or around the corresponding second cell 110b, and the third base station 112c may operate at a third frequency to service UEs 106 located in or around the corresponding third cell 110c. The cellular network 102 may be used by an operator to achieve both coverage and capacity for their subscribers, with large geographic areas split into smaller cells 110 to avoid line-of-sight signal loss and to support a large number of active UEs 106 in that area.

The cellular network 102 can employ different digital cellular technologies, such as Global System for Mobile Communications (GSM), General Packet Radio Service (GPRS), cdmaOne, CDMA2000, Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/TDMA), Integrated Digital Enhanced Network (iDEN) and/or the like.

The cellular network 102 can include a mobile phone (or "cell phone") network. In such an embodiment, the UE 106 may include a mobile telephone, or another type of wireless device, that can receive or make calls through a base station 112 and/or communicate data across the cellular network 102. For example, the UE 106 may be a smart phone or a tablet computer that includes a cellular transceiver capable of communicating with base stations 112. The base stations 112 can be connected to telephone exchanges (or "switches"), that, in turn, connect to a public telephone network and/or another network, such as the Internet.

The cellular network 102 can include a network of radio base stations 112 forming a base station subsystem, that is connected to a core circuit switched network for handling voice calls and text messages, a packet switched network for handling mobile data communications, and/or a public switched telephone network (PSTN) to connect subscribers to a wider telephony network. A UE 106 may connect to the cellular network 102 via an RBS at a corner of the corresponding cell that, in turn, connects to a mobile switching center (MSC). The MSC can provide a connection to a public switched telephone network (PSTN). The link from a phone to the RBS may be referred to as an "uplink" and the other direction may be referred to as a "downlink" The radio channels may employ multiplexing and access schemes, such as frequency division multiple access (FDMA), time division multiple access (TDMA), code division multiple access (CDMA), space division multiple access (SDMA), and/or the like.

The cellular network 102 can include one or more base station controllers (BSC) 114. A BSC 114 can control one or more base stations 112. A BSC 114 may provide radio network management, such as radio frequency control, base station handover management, call setup, and/or the like. In some embodiments, a BSC 114 can include a server (referred to as a "cellular network server") or other device for servicing request by other entities, such as UEs 106. A BSC 114 may provide some or all of the functionality described herein with regard to the cellular network 102. In some embodiments, a BSC 114 can include one or more computer systems similar to that of the computer system 1000 described below with regard to at least FIG. 8.

As a user 108 and their UE 106 move from one cell 110 to another cell 110 while a call is in progress, the UE 106 may search for a new channel to attach to in order not to drop the call. Once a new channel is found, the cellular network 102 may command the UE 106 to switch to the new channel and, at the same time, switch the call onto the new channel. With CDMA, multiple CDMA handsets can share a specific radio channel. The signals can be separated by using a pseudonoise code (PN code) specific to each phone. As a user 110 and their UE 106 move from one cell 110 to another cell 110, the handset can set up radio links with multiple base stations 112 simultaneously. This is known as "soft handoff" because, unlike some cellular technologies, there is no one defined point where the UE 106 switches to the new cell 110. With IS-95 inter-frequency handovers and older analog systems, such as NMT, it can be difficult to test the target channel directly while communicating. In this case, other techniques can be used, such as pilot beacons in IS-95. This can result in a brief break in the communication while searching for the new channel, followed by the possibility of a return to the old channel. If there is no ongoing communication or the communication can be interrupted, it may be possible for the UE 106 to spontaneously move from one cell 110 to another cell 110 and then notify the base station 112 with the strongest signal.

The wireless networks 104 (e.g., wireless networks 104*a* and 104*b*) can include one or more networks for wirelessly communicating data with mobile devices, such as the UE 106. For example, a wireless network 104 can include a wireless local area network (WLAN), such as that defined by a WiFi network operating in accordance with the Institute of Electrical and Electronics Engineers' (IEEE) 802.11 standards. The wireless networks 104 can include one or more wireless network access points (WAPs) (also referred to as "access points (APs)" or "hotspots") 120 (e.g., wireless access points 120*a*, 120*b*, and 120*c*). In the illustrated embodiments, the wireless access points 120*a* and 120*b* may provide a connection to the first wireless network 104*a*, and the wireless access point 120*c* may provide a connection to the second wireless network 104*b*. A wireless access point (WAP) can be used to connect a group of wireless devices, such as the UEs 106, to an adjacent wired local area network (LAN). A wireless access point 120 may act as a network hub, relaying data between connected wireless devices and (usually) a single connected wired device, such as an Ethernet hub or switch, allowing wireless devices to communicate with other wired devices. A WiFi wireless access point 120 may communicate with wireless devices using a signal frequency of about 2.4 gigahertz (GHz) (e.g., an ultra-high frequency (UHF) radio band) or about 5 GHz (e.g., a super-high frequency (SHF) industrial, scientific and medical (ISM) radio band). UEs 106 can include wireless adapters that allow them to connect to wireless access points 120. For example, a UE 106, such as a smart phone, a laptop computer, a tablet computer, and/or the like may include an integrated wireless adapter for conducing WiFi communications with WiFi access points 120 of the wireless networks 104 and/or an integrated cellular adapter for conducting cellular communications with base stations 112 of the cellular network 102.

WiFi technology may be used to provide Internet access to devices that are within the range of a wireless network 104 that is connected to the Internet. The coverage of one or more interconnected wireless access points 120 can extend from an area as small as a few rooms to as large as many square kilometers. The range of a wireless network 104 can be a factor of environmental conditions (e.g., whether or not the access point(s) 120 for the wireless network 104 are located indoors, outdoors, near obstructions, and/or the like), the frequency of the wireless signal used (e.g., 2.4 GHz or 5 GHz), the type of hardware used (e.g., the type of wireless antenna used), the number and/or location of wireless access points 120, and/or the like.

A UE 106 may be an electronic device that is capable of cellular communication and/or wireless communication. For example, a UE 106 may include a cellular phone, a laptop computer, a tablet computer, an electronic reader (e-reader) device, a personal digital assistant (PDA), a wearable computer device (e.g., a smart watch), and/or the like that is capable of connecting to and communicating data via the cellular network 102 and/or one or more of the wireless networks 104. A UE 106 may include a wireless adapter and/or a cellular adapter. A wireless adapter may enable the UE 106 to connect to and communicate data via one or more of the WiFi access points 120 of the wireless networks 104. A cellular adapter may enable the UE 106 to connect to and communicate data via one or more of the base stations 112 of the cellular network 102.

In some embodiments, a UE 106 may include various input/output (I/O) interfaces, such as a display screen (e.g., for displaying graphical user interfaces (GUIs)), an audible output interface (e.g., a speaker), an audible input interface (e.g., a microphone), an image acquisition interface (e.g., a camera), a biometric interface (e.g., an eye or fingerprint scanner), a keyboard, a pointer/selection device (e.g., a mouse, a trackball, a touchpad, a touchscreen, a stylus, or the like), a printer, and/or the like. In some embodiments, a UE 106 can include general computing components and/or embedded systems optimized with specific components for performing specific tasks. A UE 106 may include, for example, an e-mail application 110 (e.g., an Internet browser application for accessing the Internet, an e-mail application, and/or the like). In some embodiments, the programs or applications of a UE 106 can include one or more modules (e.g., a network connection module) including program instructions that are executable by a computer system to perform some or all of the functionality described herein with regard to a UE 106. In some embodiments, a UE 106 can include one or more computer systems similar to that of the computer system 1000 described below with regard to at least FIG. 8.

Embodiments described herein can provide for switching the data connection of a UE 106 from a cellular network 102 to a WiFi network 104 and/or vice versa. For example, embodiments can provide for relatively fast switching from the cellular network 120 to the WiFi network 104*a* when the UE is moving into the coverage area of the WiFi network 104*a*. As a further example, embodiments can provide for relatively fast switching from the WiFi network 104*a* to the cellular network 102 when the UE 106 is moving out of the coverage area of the WiFi network 104*a*.

Figure 2:
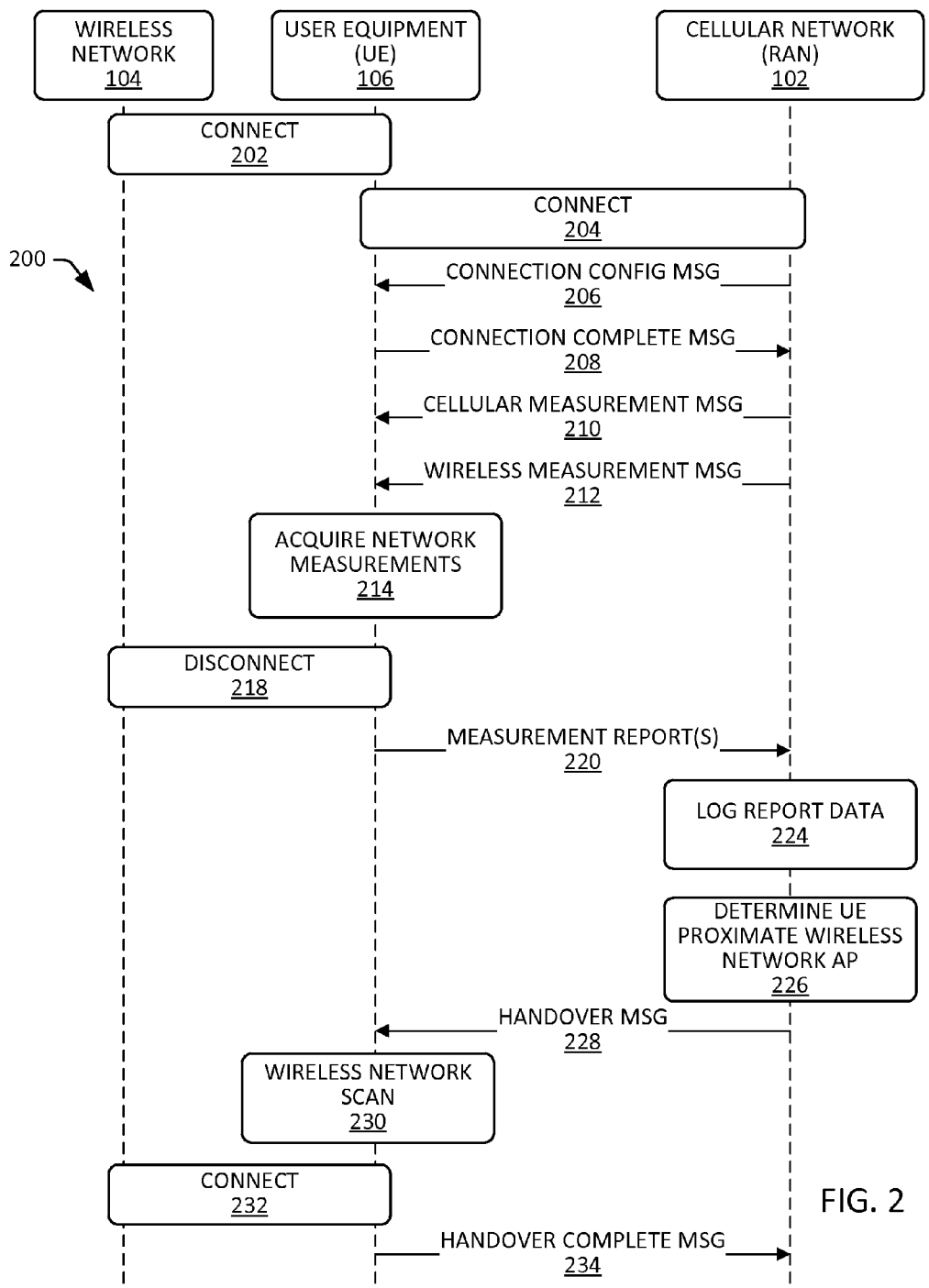
FIGS. 2 and 4 are flow diagrams that illustrate an example processes for managing device network connections in accordance with one or more embodiments.

FIG. 2 is a flow diagram that illustrates an example process 200 for managing device network connections, such as managing the connection of the UE 106 to one or more of the wireless networks 104 and the cellular network 102, in accordance with one or more embodiments.

As depicted, the UE 106 may establish a connection (also referred to as a "wireless connection") with a wireless network 104 (block 202). Establishing a wireless connection can include the UE 106 connecting to an access point 120 of a wireless network 104 such that it can send and/or receive data via the wireless network 104. For example, the UE 106 may establish a connection with the first access point 120a of the first wireless network 104a.

Following the establishment of the wireless connection, the UE 106 may establish a connection (also referred to as a "cellular connection") with the cellular network 102 (block 204). Establishing a cellular connection can include the UE 106 connecting to a base station 112 of the cellular network 102 such that it can send and/or receive data via the cellular network 102. For example, the UE 106 may establish a connection with the first base station 112a of the cellular network 102.

In response to the establishment of the cellular connection, the cellular network 102 may generate a connection configuration message 206 and transmit the connection configuration message 206 to the UE 106. The connection configuration message 206 may include a Radio Resource Control (RRC) connection reconfiguration message including, for example, one or more radio bearer (RB) setup parameters that define the service to be used. The RB setup parameters may include transport channel parameters, downlink physical channel, uplink physical channel, and/or the like.

In response to the UE 106 receiving the connection reconfiguration message 206, the UE 106 may generate a connection complete message 208 and transmit the connection complete message 208 to the cellular network 102. The connection complete message 208 may include an RRC connection reconfiguration complete message including, for example, an indication of a WiFi connection status (e.g., a value indicating an active connection to a wireless network, such as "WiFi_Status=Connected"), a WiFi identifier (e.g., an identifier of the wireless network 104a to which the UE 106 is currently connected, such as "WiFi_ID=Guest"), and a WiFi connection strength (e.g., a received signal strength indicator (RSSI) value for the connection to the access point 120a, such as "RSSI=90 dBm").

In response to the cellular network 102 receiving the connection configuration message 206, the cellular network 102 may generate a cellular measurement message 210 and/or a wireless measurement message 212, and transmit the cellular measurement message 210 and/or the wireless measurement message 212 to the UE 106. The cellular measurement message 210 may include an RRC connection reconfiguration/measurement command message that includes a measurement identifier (ID) and parameters (also referred to as "cellular measurement parameters") for measuring cellular signals received by the UE 106. The wireless measurement message 212 may include an RRC connection reconfiguration/measurement command message that includes a measurement identifier (measurement ID), and measurement parameters (also referred to as "wireless measurement parameters") for measuring wireless signals received by the UE 106.

In some embodiments, the cellular measurement parameters may specify a type and/or frequency for acquiring measurements of cellular signals received by the UE 106. The type of the cellular measurement parameters may specify acquiring measurements that include, for each of some or all of the signals received by the UE 106 that originate in the same cell 110 as the UE 106 is located in and/or in neighboring cells 110 of the cell 110 the UE 106 is located in: (a) an ID of the cell from which the signal originates (e.g., "ID=EUTRAN cell PCI 100"); (b) a reference signal received power (RSRP) of the signal (e.g., "RSRP=–90 dBm"); and (c) a reference signal received quality (RSRQ) of the signal (e.g., "RSRQ=–20 dB"). Measurements for signals originating in the same cell 110 as the UE 106 is located in (e.g., measurements for signals originating in the cell 110a) may be referred to as "SCELL" measurements. Measurements for signals originating in cells 100 neighboring the cell 110 in which the UE 106 is located (e.g., measurements for signals originating in the cells 110b and 110c) may be referred to as "NCELL" measurements. The frequency of the cellular measurement parameters may specify acquiring the cellular measurements about every 100-200 milliseconds (ms) (e.g., for intra-frequency cells) and/or about 250 ms (e.g., for inter frequency inter-RAT cells).

In some embodiments, the wireless measurement parameters may specify a type and/or frequency for acquiring measurements of the wireless signal received from the access point 120 to which the UE 106 is connected (e.g., for acquiring measurements of the wireless signal received from access point 120a). The type of the wireless measurement parameters may specify acquiring, for the wireless signal received from the access point 120 of the wireless network 104 to which the UE 106 is connected: (a) a service set identifier (SSID) of the wireless network 104 (e.g., "SSID=Guest"); (b) a basic service set identifier (BSSID) of the wireless network 104 (e.g., "BSSID 9c:1C:12:15:1e:8a"); and (c) received signal strength indicator (RSSI) for the connection to the access point 120 of the wireless network 104 ("RSSI=100 dBm"). Measurements for signals originating in the same cell 110 as the UE 106 is located (e.g., measurements for signals originating in the cell 110a) may be referred to as "SCELL" measurements. Measurements for the wireless signal received from the access point 120 to which the UE 106 is connected may be referred to as "WiFi AP" measurements. The frequency of the wireless measurement parameters may specify acquiring the wireless measurements about every 100 ms to several seconds, for example.

Although the cellular measurement message 210 and the wireless measurement message 212 are illustrated and described as separate messages in an example embodiment, embodiments can include some or all of the contents of the cellular measurement message 210 and the wireless measurement message 212 being contained in a single message. For example, the cellular network 102 may generate a combined cellular/wireless measurement message, including some or all of the described contents of measurement message 210 and some or all of the wireless measurement message 212 and transmit the combined cellular/wireless measurement message to the UE 106 in place of one or both of the cellular measurement message 210 and the wireless measurement message 212.

Following receipt of the cellular measurement message 210 and/or the wireless measurement message 212, the UE 106 may acquire corresponding network measurements (block 214). This can include the acquisition of cellular measurements in accordance with cellular measurement parameters specified in the cellular measurement message 210 and/or the acquisition of wireless network measurements in accordance with wireless measurement parameters specified in the wireless measurement message 212. For example, if the UE 106 is receiving a first cellular signal from the first base station 112a in the first cell 110a, a second cellular signal from the second base station 112a in the second cell 110b, and a third cellular signal from the third base station 112c in the third cell 110c, then the UE 106 may acquire cellular measurements for each of the cellular signals at the frequency specified in the cellular measurement parameters (e.g., about every 100-250 ms). If the UE 106 is connected to the first wireless network 104a via the first access point 120a, then the UE 106 may acquire wireless measurements for the wireless signal at the frequency specified in the wireless measurement parameters (e.g., about every 100 ms to several seconds).

The UE 106 may store the acquired measurements locally. For example, the UE 106 may store the acquired cellular measurements and/or the acquired wireless measurements in a memory of the UE 106. As described herein, the UE 106 may provide the acquired cellular measurements and/or the acquired wireless measurements to the cellular network 102 via one or more measurement reports.

As depicted, the UE 106 may be disconnected from the wireless network 104 (block 218) at some point. This disconnect can include breaking the previously established wireless connection between the UE 106 and the wireless network 104. For example, the UE 106 may intentionally disconnect from the first AP 120*a* of the first wireless network 104*a* (e.g., in response to the user 108 requesting to terminate the connection to the first wireless network 104*a*), the AP 120*a* may intentionally disconnect the UE 106 from the AP 120*a* and the first wireless network 104*a*, and/or the UE 106 may simply lose the wireless connection with the AP 120*a* as a result of a poor wireless signal, such as that caused by the user 108 moving the UE 106 out of range of the AP 120*a*.

The UE 106 may generate one or more measurement reports 220 and transmit the one or more measurement reports 220 to the cellular network 102. A measurement report 220 may include some or all of the acquired cellular measurements and/or some or all of the acquired wireless measurements. A measurement report 220 that includes wireless measurements may be referred to as a "wireless" measurement report 220. A measurement report 220 that includes cellular measurements may be referred to as a "cellular" measurement report 220. A measurement report 220 that includes wireless measurements and cellular measurements may be referred to as a "wireless/cellular" measurement report 220.

The timing and/or frequency of generation and/or transmission of the measurement reports 220 may be specified in reporting parameters of the wireless measurement parameters and/or the cellular measurement parameters. In some embodiments, the reporting parameters may specify that the reports are to be generated and/or transmitted to the cellular network periodically, such as once per minute. Thus, for example, if the UE 106 is connected to the wireless network 104 for a little over 3 minutes, the UE 106 may generate and transmit 3 measurements reports to the cellular network 102 prior to the UE 106 being disconnected. As another example, about 1 minute after being connected to the wireless network 104 and the cellular network 102 the UE 106 may generate and transmit to the cellular network 102 a first wireless/cellular measurement report 220 that includes the wireless measurements and the cellular measurements acquired during the first minute about 2 minutes after being connected to the wireless network 104 and the cellular network 102, the UE 106 may generate and transmit to the cellular network 102 a second wireless/cellular measurement report 220 that includes the wireless measurements and the cellular measurements acquired during the second minute; and about 3 minutes after being connected to the wireless network 104 and the cellular network 102, the UE 106 may generate and transmit to the cellular network 102 a third measurement report 220 that includes the wireless measurements and the cellular measurements acquired during the third minute.

In some embodiments, the UE 106 may continue to generate measurement reports 220 and transmit them to the cellular network 102 even after the UE 106 is disconnected from the wireless network 104. These may be referred to as "post-disconnect" measurement reports 220. For example, if the UE 106 is disconnected from the wireless network 104 at about 3 minutes and 30 seconds after being connected to the wireless network 104 and the cellular network 102, then about 4 minutes after being connected to the cellular network 102, the UE 106 may generate and transmit to the cellular network 102 a fourth measurement report 220 that includes the wireless measurements and the cellular measurements acquired during the fourth minute. Further, about 5 minutes after being connected to the cellular network 102, the UE 106 may generate and transmit to the cellular network 102 a fifth measurement report 220 that includes the wireless measurements and the cellular measurements acquired during the fifth minute, and so forth. In some embodiments, the measurement parameters may instruct the UE 106 to only acquire wireless measurements while it is connected to the wireless network 104. Thus, the measurement report 220 following the UE 106 disconnect from the wireless network 102 (e.g., the fourth measurement report 220) may include cellular measurement from before and after the disconnect event. Wireless measurements acquired up to the disconnect event, and subsequent measurement reports 220 (e.g., the fifth measurement report 220, a sixth measurement report 220, and so forth) may be cellular measurement reports 220 that include cellular measurement from after the disconnect event, but do not include any wireless measurements. That is, for example, the fourth measurement report 220 may include wireless measurements acquired from about 3 minutes to about 3.5 minutes (the time at which the UE 106 disconnected from the wireless network 104, and the fifth measurement report 220 may not include any wireless measurements, as it is reporting measurements acquired during the fifth minute, a time span in which the UE 106 is disconnected from the wireless network 104, and no wireless measurements are being acquired.

In some embodiments, the measurement report 220 following the UE 106 disconnect from the wireless network 102 may include an indication of the disconnection of the UE 106 from the wireless network 104. For example, the measurement report 220 following the UE 106 disconnect from the wireless network 102 (e.g., the fourth measurement report 220) may include an indication of a WiFi connection status (e.g., a value indicating an inactive connection to a wireless network, such as "WiFi_Status=Disconnected"), and a WiFi identity (e.g., an identifier of the wireless network 104*a* from which the UE 106 disconnected, such as "WiFi_ID=Guest").

In some embodiments, reporting may be based on a triggering event. For example, if a disconnect from a wireless network 104 is specified as a triggering event, then in response to determining that the UE 106 has been disconnected from the wireless network 104*a*, the UE 106 may generate and transmit to the cellular network 102 a wireless/cellular measurement report 220 that includes wireless measurements and cellular measurements that have not yet been provided to the cellular network 102 (e.g., wireless measurements and cellular measurements that have not yet been included in any measurement reports 220 already sent to the cellular network 102). For example, if the reporting parameters specify that measurement reports are to be generated and/or transmitted to the cellular network 102 once per minute, and in response to a disconnect event, then in response to determining that the UE 106 has been disconnected from the wireless network 104*a* at about three minutes and thirty seconds, the UE 106 may generate and transmit to the cellular network 102 (shortly after the disconnect) a wireless/cellular measurement report 220 that includes wireless measurements and cellular measurements acquired from about the 3 to about 3.5 minutes (e.g., wireless measurements and cellular measurements that had not yet been included in any measurement reports 220 already sent to the cellular network 102). The wireless/cellular measurement report 220 may also include an indication of the disconnection of the UE 106 from the wireless network 104. Notably, the third and fourth measurement reports may also be provided at the 1 minute intervals. As a further example, if the reporting parameters specify that a measurement report is to be generated and/or transmitted in response to a disconnect event, and follow-up cellular reports are to be generated and/or transmitted to the cellular network 102 once per minute while the UE 106 is not connected to a wireless network 102, then in response to determining that the UE 106 has been disconnected from the wireless network 104a at about three minutes and thirty seconds, the UE 106 may generate and transmit to the cellular network 102 (shortly after the disconnect) a wireless/cellular measurement report 220 that includes wireless measurements and cellular measurements acquired for the about three minutes and thirty seconds that the UE 106 was connected to the wireless network 104 and the cellular network 102 (e.g., wireless measurements and cellular measurements that had not yet been included in any measurement reports 220 already sent to the cellular network 102). The wireless/cellular measurement report 220 may also include an indication of the disconnection of the UE 106 from the wireless network 104. Following the disconnect of the UE 106 from the wireless network 102, the UE 106 may generate and transmit to the cellular network 104, cellular measurement reports 220 about every minute (e.g., at a time of about one minute, two minutes and so forth, after the disconnect of the UE 106 from the wireless network 102).

In some embodiments, a measurement report 220 can include a measurement ID that corresponds to the measurement ID provided in the corresponding cellular measurement message 210 and/or the corresponding wireless measurement message 212 for which the measurements in the report have been acquired. For example, if a measurement report 220 includes wireless measurements acquired in accordance with parameters of a wireless measurement message 212 that included a first measurement ID, then the measurement report 220 may also include the first measurement ID provided in association with the wireless measurements in the measurement report 220. If a measurement report 220 includes cellular measurements acquired in accordance with parameters of a cellular measurement message 212 that included a second measurement ID, then the measurement report 220 may also include the second measurement ID provided in association with the cellular measurements in the measurement report 220. Such a measurement ID scheme may enable the wireless network 102 to resolve what the various measurements are and who/what they are associated with. For example, the cellular network 102 can use a measurement ID in a wireless/cellular report 220 to determine that a set of wireless measurements in the wireless/cellular report 220 are wireless measurements for the UE 106, and that a set of cellular measurements in the wireless/cellular report 220 are cellular measurements for the UE 106.

The cellular network 102 may log the measurement data contained in the received measurement reports 220 (block 224). For example, if the cellular network 102 receives measurement reports 220 that include cellular measurements (e.g., SCELL measurements and NCELL measurements) and wireless measurements (e.g., WiFi AP measurements), the cellular network 102 (e.g., the BCS 114) may store these values in a database. As described herein, such a database can be used to determine physical locations of UEs 106 relative to APs 120 and/or RBSs 112, and this information can be used by the cellular network 102 to notify UEs 106 of APs 120 in-range and/or command the UEs 106 to scan for and connect to APs 120 in-range.

FIG. 3 is a table that illustrates contents of an example network measurement log 300 in accordance with one or more embodiments. The log 300 includes rows that represent an entry of the log. Each entry may correspond to a set of measurements acquired at or near the same time. An entry may include cellular measurements (e.g., SCELL measurements and NCELL measurements), wireless measurements (e.g., WiFi AP measurements), a geographic location (e.g., geographic coordinates indicative of a geographic location of the UE 106 at or near the time the corresponding measurements are acquired), a timestamp (e.g., a time corresponding to the time the corresponding measurements are acquired), and/or the like. For example, in the illustrated embodiment, the first row 302a corresponds to a first set of cellular measurements (e.g., SCELL measurements and NCELL measurements) and wireless measurements (e.g., WiFi AP measurements) acquired by, for example, the UE 106 at about 8:00:00 am on Dec. 3, 2015, when the UE was located at about 37.7833° N, 122.4167° W. The second row 302b corresponds to a second set of cellular measurements (e.g., SCELL measurements and NCELL measurements) and wireless measurements (e.g., WiFi AP measurements) acquired by the UE 106 at about 8:00:05 am on Dec. 3, 2015, when the UE was located at about 37.7843° N, 122.4157° W. Although only two entries are illustrated for the purpose of illustration, it will be appreciated that embodiments can include any number of entries. For example, if measurements are acquired about every 100 ms, e.g., by the UE 106, and reports are generated about once per minute, then upon receipt of each report, about 600 entries may be added to such a log 300. Similar logs and/or entries can be created based on measurements acquired from multiple UEs 106. Thus, the log 300 may include measurement data crowd-sourced from measurement reports 220 (see, e.g., FIG. 2) received from some or all of the UEs 106 connected to the cellular network 102. In some embodiments, the log 300 may be purged of old data in an effort to maintain fresh data. For example, entries in the log 300 that are of at least a threshold age may be removed from the log 300. For example, if an entry age threshold is set to 48 hours and the time is currently 8:00 am on Dec. 15, 2015, then entries having a timestamp before 8:00 am on Dec. 13, 2015 may be removed from the log 300.

The cellular network 102 may determine that the UE 106 has disconnected from, or is otherwise not connected to, the wireless network 104 based on a connection measurement report 218. For example, the cellular network 102 may determine that the UE 106 has disconnected from the AP 120a and/or the wireless network 104a based on the WiFi connection status (e.g., a value indicating an inactive connection to a wireless network, such as "WiFi_Status=Disconnected") and/or the WiFi identity (e.g., an identifier of the wireless network 104a from which the UE 106 disconnected, such as "WiFi_ID=Guest") contained in the measurement report 220 generated and transmitted to the wireless network 102 in response to, or at least after, the UE 106 is disconnected from the AP 120a and the "Guest" wireless network 104a (e.g., the disconnect at block 218).

In response to determining that the UE 106 is not connected to the wireless network 104, the cellular network 102 may determine whether the UE 106 is proximate to (e.g., in the coverage area of or otherwise in range of) a wireless network access point (block 226). For example, the cellular network 102 may compare the cellular measurements of the measurement reports 220 received from the UE 106 after the disconnect from the wireless network 104a to the logged measurements to determine whether the UE 106 is proximate to an AP 120 for a wireless network 104. In some embodiments, this determination can include the cellular network 102 comparing the values of the cellular measurements of the cellular measurement reports 220 received from the UE 106 to the cellular measurements that were acquired by the UE 106 (or one or more other UEs 106) while it was in range of wireless network 104 (e.g., the cellular measurements that were received in the wireless/cellular reports 220 received from the UE 106 (or one or more other UEs 106) while it was connected to an AP 120 of a wireless network 104. The cellular network 102 may determine that the UE 106 is proximate to an AP 120 if the most recent cellular measurements report 220 received from the UE 106 includes cellular measurements that match (e.g., are within a threshold range) of one or more logged cellular measurements associated with the AP 120. For example, the cellular network 102 may determine (e.g., using its current log 300) that a UE 106 is proximate to (e.g., within range of) the wireless network 104a (e.g., the Guest network 104a) when the cellular measurements reported by the UE 106 include: (1) an SCELL measurement having: (a) an ID of "EUTRAN cell PCI 100"; (b) a RSRP in the range of −92 dBm+/−10%; and (c) RSRQ in the range of −21 dB+/−10%; and (2) an NCELL measurement having: (a) an ID of "EUTRAN cell PCI 200"; (b) a RSRP in the range of −104 dBm+/−10%; and (c) RSRQ in the range of −23 dB+/−10%. In such a situation, in response to the cellular network 102 receiving a cellular measurement report 220 from the UE 106 while the UE 106 is disconnected from the AP 120a and the wireless network 104a, that include: (1) an SCELL measurement having: (a) an ID of "EUTRAN cell PCI 100"; (b) a RSRP=−90 dBm; and (c) RSRQ=−20 dB; and (2) an NCELL measurement having: (a) an ID of "EUTRAN cell PCI 200"; (b) RSRP=−100 dBm; and (c) RSRQ=−24 dB, the cellular network 102 may determine that the received cellular measurements match (e.g., fall within the range of) the cellular measurements associated with the Guest wireless network 104a, and, thus, that the UE 106 proximate to (e.g., within range of) the Guest wireless network 104a. For example, the UE 106 may become disconnected from the first access point 120a and the Guest wireless network 104a when the user 108 moves the UE 106 away from the first access point 120a. The user 108 may, then, move the UE 106 toward the UE 106 within range of the second AP 120b of the Guest wireless network 104a. As a result, the cellular measurements contained in the cellular measurement reports 220 received from the UE 106 by the cellular network 102 may fall within range of the cellular measurements associated with the Guest wireless network 104a, and upon the cellular network 102 comparing the cellular measurements contained in the cellular measurement reports 220 to the logged measurements, the cellular network 102 may determine that the that the cellular measurements match (e.g., fall within the range of) the cellular measurements associated with the wireless network 104a, and that the UE 106 is proximate to an AP 120 of the first wireless network 104a.

If the cellular network 102 determines that the cellular measurements of a measurement report 220 received from a UE 106 do not match (e.g., do not fall within the range of) the cellular measurements associated with any wireless networks 104 (e.g., including those associated with the wireless networks 104a, 104b and so forth), then the cellular network 102 may determine that the UE 106 is not proximate to (e.g., within range of) a wireless network 104. If it is determined that the UE 106 is not proximate to a wireless network 104, then the cellular network 102 may continue to monitor the cellular measurement reports 220 received from the UE 106 to determine whether the UE 106 is proximate to a wireless network 104.

If it is determined that the UE 106 is proximate to a wireless network 104, then the cellular network 102 may generate a handover message 228, and transmit the handover message 228 to the UE 106. The handover message 228 may include an indication that the UE 106 is proximate to the wireless network 104, and may command the UE 106 to attempt to connect to the wireless network 104 (e.g., to conduct a wireless network scan for the wireless network 104). For example, if the cellular network 102 determines that the UE 106 is proximate to the Guest wireless network 104a, the cellular network 102 may transmit a handover message 228 commanding the UE 106 to attempt to connect to the Guest wireless network 104a and/or other wireless networks 104 (e.g., to conduct a wireless network scan for the Guest wireless network and/or other wireless networks).

In response to the UE 106 receiving the handover message 228, the UE 106 may conduct a wireless network scan (block 230). The wireless network scan may include a scan to connect to an AP 120 of one or more wireless networks 104 indicated in the handover message 228. For example, if the handover message 228 identified the Guest wireless network 104a, then the UE 106 may conduct a wireless network scan for the Guest wireless network 104a and/or other wireless networks 104.

If the UE 106 is able to establish a connection with the wireless network 104 (block 232), then the UE 106 may generate a handover complete message 234, and transmit the handover complete message 234 to the cellular network 102. For example, if the UE 106 establishes a connection with the second AP 120b of the Guest wireless network 104a and, thus, establishes a connection with the Guest wireless network 104a, then the UE 106 may generate and transmit to the cellular network 102 a handover complete message 234 that indicates that the UE 106 has successfully connected to the Guest wireless network 104a.

If the cellular network 102 receives a handover complete message 234 that indicates a successful connection to a wireless network 104, the cellular network 102 may discontinue monitoring the cellular measurements for the UE 106 to determine whether the UE 106 is proximate to a wireless network 104. Once connected to a wireless network 104, the above process may be repeated. For example, in a manner similar to that described above, the UE 106 and the cellular network 102 may exchange a connection configuration message 206, a connection complete message 208, and cellular and wireless measurement messages 210 and 212. The UE 106 may also acquire cellular and/or wireless measurements and report them via one or more measurement reports 220. Upon the UE 106 becoming disconnected from the wireless network 104a, the cellular network 102 may monitor the measurement reports to determine when the UE 106 is proximate to a wireless network 104, and so forth. Such a process can be repeated multiple times to keep the UE 106 connected to wireless networks 104 when they are available.

If the UE is not able to establish a connection with a wireless network 104, the UE 106 may not transmit a handover complete message to the cellular network 102, and/or may generate and transmit a no-connect message (e.g., indicating that a wireless connection with a wireless network 104 has not been established) to the cellular network 102. If the cellular network 102 does not receive a handover complete message 234 that indicates a successful connection to a wireless network 104 and/or receives a no-connect message, then the cellular network 102 may continue or resume determining whether the UE 106 is proximate to a wireless network access point (block 226) and transmitting corresponding handover messages 228 to aid in reestablishing a wireless connection between the UE 106 and a wireless network 104. A process similar to that described with regard to FIG. 2 can be provided for some or all of the UEs 106 serviced by the cellular network 102 in an effort to connect UEs 106 to the wireless networks 104.

Figure 4:
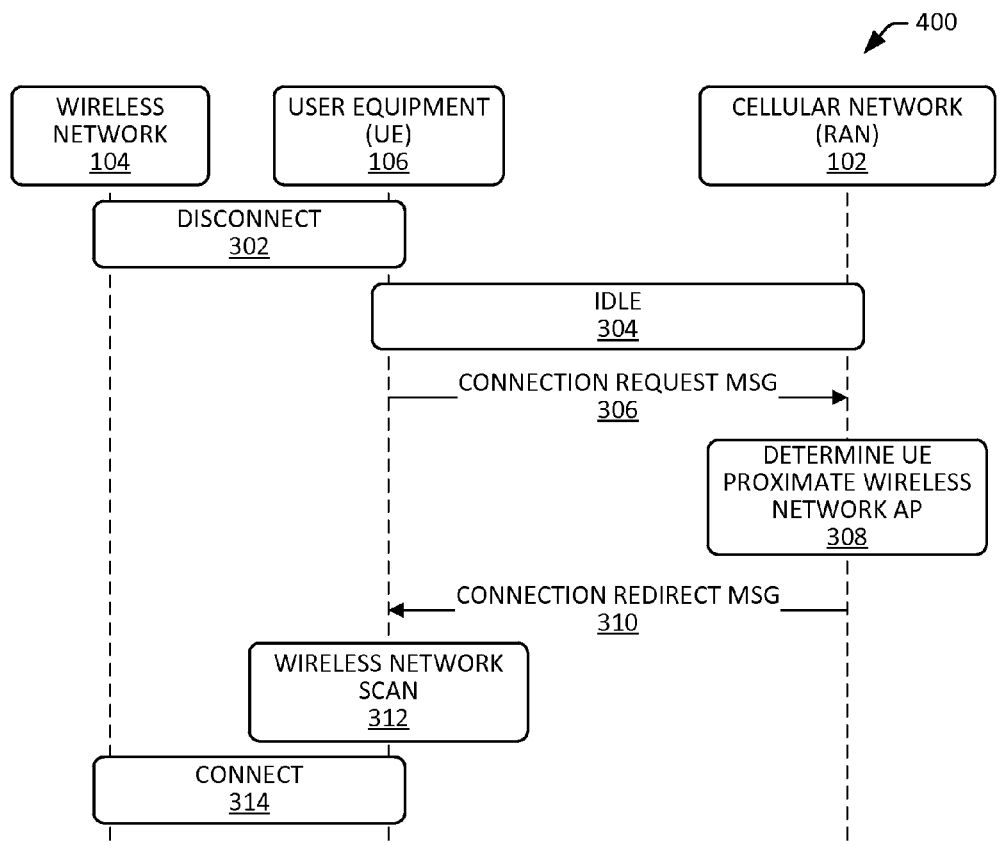

FIG. 4 is a flow diagram that illustrates an example process 400 for managing device network connections, such as managing the connection of the UE 106 to one or more of the wireless networks 104 and the cellular network 102, in accordance with one or more embodiments.

As depicted, the UE 106 may be disconnected from a wireless network 104 (block 302), and the UE 106 may have or otherwise establish an idle connection with a cellular network 102 while disconnected from the wireless network 104. For example, the UE 106 may become disconnected from the Guest wireless network 104a, but may maintain an idle connection with the cellular network 102. During an idle connection (also called "idle", "park" or "standby" mode) the power consumption of the UE 106 may be low relative to an active connection state and the UE 106 may be locked to a control channel or a beacon channel of its strongest received RBS 112. In idle mode, the UE 106 may "sleep" most of the time, but may "wakes up" at regular intervals to listen to the control or beacon channel to re-synchronize itself to the RBS 112 and to determine whether it has any page messages waiting. If a connection is desired (either initiated by the RBS 112 or initiated by the UE 106), an initial connection can be made between the UE 106 and the RBS 112 to which the terminal is locked, and initial messages are exchanged over this connection for negotiating the type of service required, among other things.

During the period in which the UE 106 is disconnected from the wireless network 104 and is at least idly connected with the cellular network 102, the UE 106 may generate a connection request message 306, and transmit the connection request message 306 to the cellular network 102. The connection request message 306 may include an RRC connection requests including a cause, SCELL measurements, and NCELL measurements. For example, the UE 106 may generate and transmit to the cellular network 102 an RRC connection request message including a cause of "originating-StreamingCall;" SCELL measurements including: (a) an ID of "EUTRAN cell PCI 100"; (b) a RSRP=−90 dBm; and (c) RSRQ=−20 dB; and NCELL measurements including: (a) an ID of "EUTRAN cell PCI 200"; (b) RSRP=−100 dBm; and (c) RSRQ=−24 dB.

In response to cellular network 102 receiving the connection request message 306, the cellular network 102 may determine whether the UE 106 is proximate to a wireless network access point (block 308). Such a determination may be similar to that described with regard to block 226 of FIG. 2. For example, in response to a connection request message 306 from the UE 106, the cellular network 102 may compare the cellular measurements in the connection request message 306 received from the UE 106 to logged cellular measurements (e.g., of log 300) to determine whether the UE 106 is proximate to an AP 120 of a wireless network 104. The logged cellular measurements can include measurements received from the UE 106 (e.g., via measurement reports received from the UE 106) and/or received from other UEs 106 (e.g., via measurement reports received from one or more other UEs 106). That is, the log can include measurements "crowd-sourced" from any number of UEs 106. The cellular network 102 may determine that the UE 106 is proximate to an AP 120 of a wireless network 104 if the cellular measurements in the connection request message 306 received from the UE 106 include cellular measurements that match (e.g., are within a threshold range) of one or more cellular measurements associated with the wireless network 104. If the cellular network 102 determines that the cellular measurements of the connection request message 306 received from a UE 106 do not match (e.g., do not fall within the range of) the cellular measurements associated with any wireless networks 104 (e.g., including those associated with the wireless networks 104a, 104b and so forth), then the cellular network 102 (e.g., the BSC 114) may determine that the UE 106 is not proximate to (e.g., within range of) a wireless network 104. If it is determined that the UE 106 is not proximate to a wireless network 104, then the cellular network 102 may establish a cellular connection with the UE 106. For example, the cellular network 102 may establish the requested cellular connection, and enable the UE 106 to exchange data via the cellular network 102 such that the cause can be served via the cellular network 102.

If it is determined that the UE 106 is proximate to a wireless network 104, then the cellular network 102 may generate a connection redirect message 310, and transmit the connection redirect message 310 to the UE 106. The connection redirect message 310 may include an indication that the UE 106 is proximate to the wireless network 104 and may command the UE 106 to attempt to connect to the wireless network 104 (e.g., to conduct a wireless network scan for the wireless network 104). For example, if the cellular network 102 determines that the UE 106 is proximate to the Guest wireless network 104a, the cellular network 102 may transmit a connection redirect message 310 commanding the UE 106 to attempt to connect to the Guest wireless network 104a and/or other wireless networks 104 (e.g., to conduct a wireless network scan for the Guest wireless network and/or other wireless networks).

In response to the UE 106 receiving the connection redirect message 310, the UE 106 may conduct a wireless network scan (block 312). Such a wireless network scan may be similar to that described with regard to block 230 of FIG. 2. The wireless network scan may include a scan to connect to an AP 120 of one or more wireless networks 104 indicated in the connection redirect message 310. For example, the UE 106 may conduct a wireless network scan for the Guest wireless network 104a and/or other wireless networks 104.

If the UE 106 is able to establish a connection with the wireless network 104 (block 314), then the UE 106 may enable its request to be serviced by the wireless network 102. For example, if the cause of the connection request message 306 was to download data from the Internet, the UE 106 may download the data via the Guest wireless network 104a, as opposed to via the cellular network 102.

Figure 5:
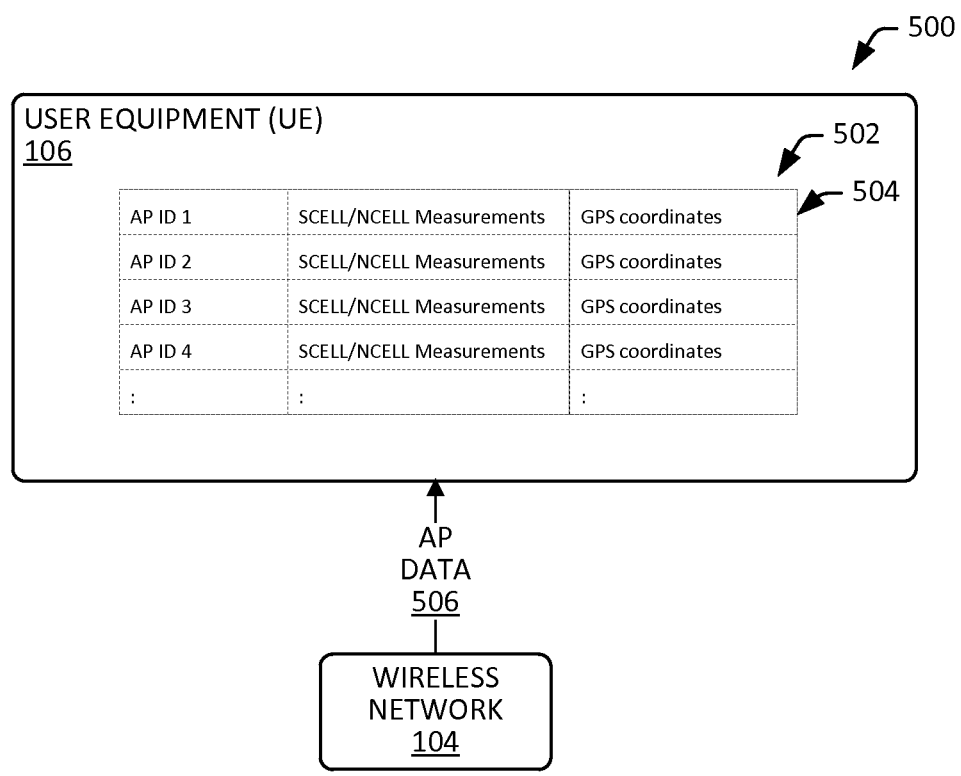
FIG. 5 is a flow diagram that illustrates an example process for autonomous user equipment reselection in accordance with one or more embodiments.

FIG. 5 is a flow diagram that illustrates an example process 500 for autonomous UE reselection in accordance with one or more embodiments. In some embodiments, a UE 106 connects to an AP 120 of a wireless network 104. Once connected, the UE 106 adds the access point 120 to an AP table 502 that includes a listing of information for APs 120 that the UE 106 has connected to in the past. The table 502 may be stored locally in a memory of the UE 106. Each row of the table may be referred to as a "fingerprint" 504 for the AP 120 that includes a WiFi AP identity, SCELL and NCELL measurements, and/or GPS coordinates. The WiFi AP identity may be acquired by the UE 106 via AP data 506 received by the UE 106 from the wireless network 104 when the UE is connected to the AP 120. The SCELL and NCELL measurements and GPS coordinates may be measured by the UE 106 when it is connected to the respective AP 120, and is operating in an Idle or Connected mode with the cellular network 102. During operation, the UE 106 may compare the existing cellular environment to check its proximity to an AP 120 in the table 502 that it connected to in the past, and when it detects that it is proximate to an AP 120 in the table 502, the UE 106 can initiate a wireless scan to locate and connect to the AP 120 and its wireless network. For example, while it is operating, the UE 106 may acquire current cellular measurements and/or current GPS coordinates and compare them to the cellular measurements and/or current GPS coordinates of the fingerprints 504 in the table 502. If the UE 106 determines that the current cellular measurements and/or current GPS coordinates match a fingerprint 504 for an ID 1 AP 120 of the table 502 (e.g., the current cellular measurements and/or current GPS coordinates fall within a maximum and minimum range of the cellular measurements and/or current GPS coordinates of a fingerprint for the ID 1 AP 120), then the UE 106 can initiate a wireless network scan to locate and connected to the ID 1 AP 120. Thus, in some embodiments, the UE 106 can autonomously determine proximity of an AP 120 for a wireless network 104 and can initiate a scan to connect to the AP 120 and the wireless network 104.

In some embodiments, the table 502 can be generated based on measurements acquired by the UE 106 and/or other UEs 106. For example, the UE 106 may download from the cellular network 102 (e.g., via a wireless network 104 and/or the cellular network 102), fingerprints 502 received from other UEs 106 of the cellular network 102. These fingerprints 502 can be used in place of or in conjunction with the fingerprints 502 generated by the UE 106 to construct the table 502. Thus, the table 502 can be generated via crowd sourcing fingerprints 504 from one or more other UEs 106 of the cellular network 102.

Figure 6:
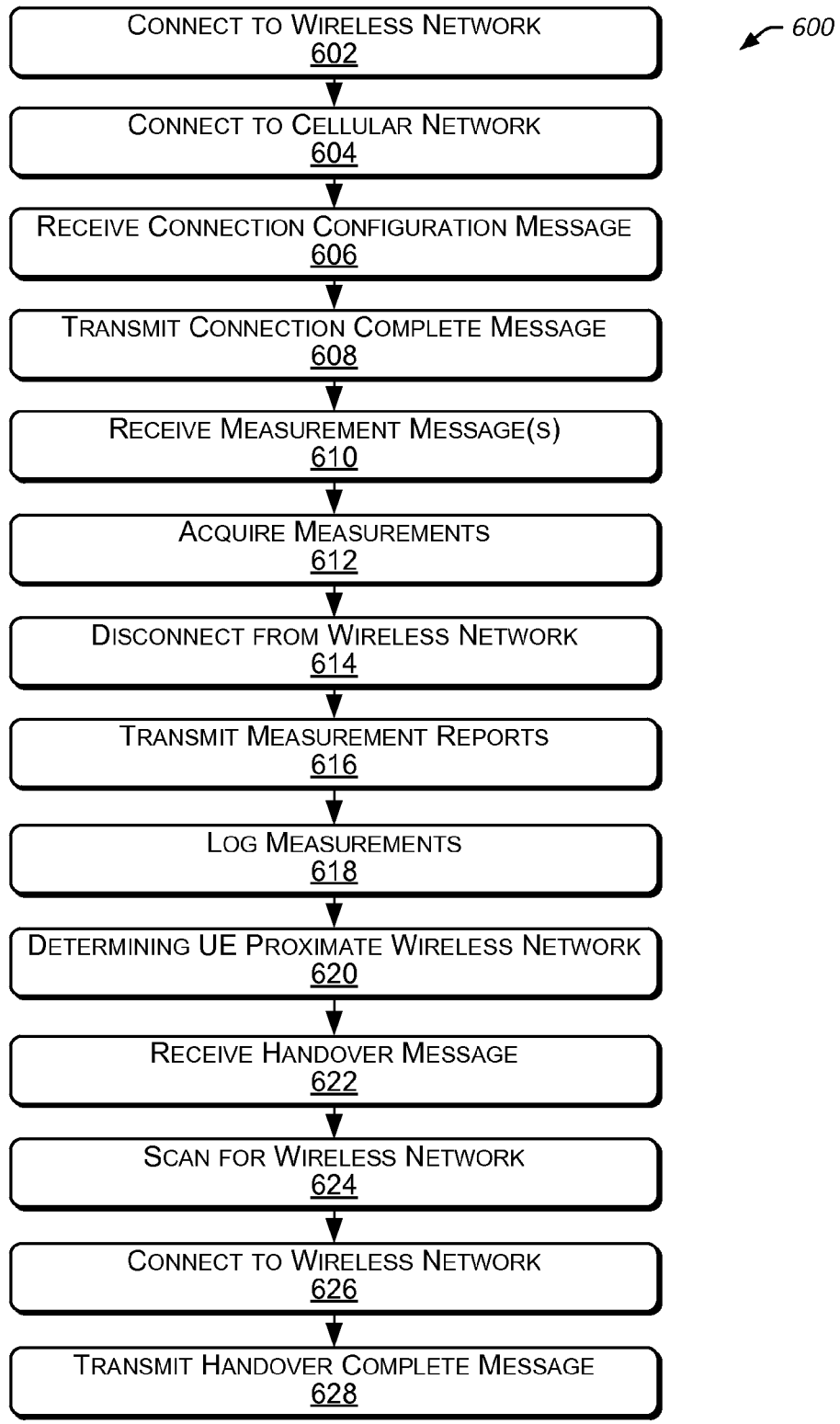
FIGS. 6 and 7 are flowcharts that illustrate example methods for managing device network connections in accordance with one or more embodiments.

FIG. 6 is a flowchart that illustrates an example method 600 for managing connection of a device (e.g., a UE 106) to networks (e.g., a wireless network 104 and a cellular network 102) in accordance with one or more embodiments. Some or all of the described operations of method 600 may be carried out by the UE 106 and/or the cellular network 102 (e.g., the BSC 114 of the cellular network 102).

In some embodiments, the method 600 can include connecting to a wireless network (block 602). Connecting to a wireless network may include the UE 106 connecting to an access point 120 of a wireless network 104 such that it can send and/or receive data via the wireless network 104. For example, the UE 106 may establish a connection with the first access point 120a of the first wireless network 104a.

In some embodiments, the method 600 can include connecting to a cellular network (block 604). Connecting to a cellular network can include the UE 106 connecting to a base station 112 of the cellular network 102 such that it can send and/or receive data via the wireless network 104. For example, the UE 106 may establish a connection with the first base station 112a of the cellular network 102.

In some embodiments, the method 600 can include receiving a connection configuration message (block 606). Receiving a connection configuration message can include the UE 106 receiving a connection configuration message 206 generated by and transmitted from the cellular network 102 (e.g., generated by and transmitted from the BSC 114).

In some embodiments, the method 600 can include transmitting a connection complete message (block 608). Transmitting a connection complete message can include the UE 106 generating and transmitting to the cellular network 102 (e.g., to the BSC 114) a connection complete message 208.

In some embodiments, the method 600 can include receiving one or more measurement messages (block 610). Receiving one or more measurement messages can include the UE 106 receiving a cellular measurement message 210 generated by and transmitted from the cellular network 102 (e.g., from the BSC 114), a wireless measurement message 212 generated by and transmitted from the cellular network 102 (e.g., from the BSC 114), and/or a cellular/wireless measurement message generated by and transmitted from the cellular network 102 (e.g., from the BSC 114). Such a measurement message may include cellular measurement parameters for measuring cellular signals received by the UE 106, and/or wireless measurement parameters for measuring wireless signals received by the UE 106.

In some embodiments, the method 600 can include acquiring measurements (block 612). Acquiring measurements can include the acquisition of cellular measurements in accordance with cellular measurement parameters specified in the one or more measurement messages and/or the acquisition of wireless network measurements in accordance with wireless measurement parameters specified in the one or more measurement messages. In some embodiments, the UE 106 may store the acquired measurements locally. For example, the UE 106 may store the acquired cellular measurements and/or the acquired wireless measurements in a memory of the UE 106. As described herein, the UE 106 may provide the acquired cellular measurements and/or the acquired wireless measurements to the cellular network 102 (e.g., to the BSC 114) via one or more measurement reports.

In some embodiments, the method 600 can include disconnecting from the wireless network (block 614). Disconnecting from the wireless network can include breaking the previously established wireless connection between the UE 106 and the wireless network 104. For example, the UE 106 may intentionally disconnect from the first AP 120a of the Guest wireless network 104a (e.g., in response to the user 108 requesting to terminate the connection to the Guest wireless network 104a), the AP 120a may intentionally disconnect the UE 106 from the AP 120a and the Guest wireless network 104a, and/or the UE 106 may simply lose the wireless connection as a result of a poor wireless signal, such as that caused by the user 108 moving the UE 106 out of range of the AP 120a. Disconnecting from the wireless network can include the cellular network 102 (e.g., the BSC 114) determining that the UE 106 has disconnected from or is otherwise not connected to the wireless network 104 based on a connection measurement report 218. For example, the cellular network 102 (e.g., the BSC 114) may determine that the UE 106 has disconnected from the AP 120a and/or the Guest wireless network 104a based on the WiFi connection status (e.g., a value indicating an inactive connection to a wireless network, such as "WiFi_Status=Disconnected") and/or the WiFi identity (e.g., an identifier of the wireless network 104a from which the UE 106 disconnected, such as "WiFi_ID=Guest") contained in a measurement report 220 generated and transmitted to the wireless network 102 in response to, or at least after, the UE 106 is disconnected from the AP 120a and the Guest wireless network 104a.

In some embodiments, the method 600 can include transmitting one or more measurement reports (block 616). Transmitting one or more measurement reports can include the UE 106 generating and transmitting one or more measurement reports 220 to the cellular network 102 (e.g., to the BSC 114). The measurement reports 220 may include one or more wireless/cellular measurement reports 220, one or more wireless measurement reports 220, and/or one or more cellular measurement reports 220. In some embodiments, the UE 106 may generate and transmit wireless measurement reports 220 to the cellular network 102 (e.g., to the BSC 114) in accordance with reporting parameters of the wireless measurement parameters and/or the cellular measurement parameters provided in the measurement messages received at block 610. For example, the UE 106 may generate and transmit wireless measurement reports 220 to the cellular network 102 (e.g., to the BSC 114) periodically (e.g., every minute), in response to a triggering event, and/or the like.

In some embodiments, the method 600 can include logging measurements (block 618). Logging measurements can include the cellular network 102 (e.g., the BCS 114) logging the measurement data contained in the measurement reports 220 received from the UE 106 and/or other UEs 106 connected to the cellular network 102. For example, if the cellular network 102 receives measurement reports 220 that include cellular measurements (e.g., SCELL measurements and NCELL measurements) and wireless measurements (e.g., WiFi AP measurements), the cellular network 102 (e.g., the BCS 114) may store these values in a database or other memory of cellular network 102. As described herein, such a database can be used to determine physical locations of UEs 106 relative to APs 120, and this information can be used by the cellular network 102 to notify UEs 106 of APs 120 in-range and/or command the UEs 106 to scan for and connect to in-range APs 120.

In some embodiments, the method 600 can include determining that a UE is proximate to a wireless network (block 620). Determining that a UE is proximate to a wireless network 104 can include the cellular network 102 (e.g., the BCS 114) determining whether the UE 106 is proximate to a wireless network based on a comparison of the cellular measurements received from the UE 106 to the cellular measurements logged by the cellular network 104. For example, in response to determining that the UE 106 is not connected to the wireless network 104, the cellular network 102 (e.g., the BCS 114) may compare the cellular measurements of the measurement reports 220 received from the UE 106 after the disconnect from the wireless network 104a to determine whether the UE 106 is proximate to an AP 120 for a wireless network 104. In some embodiments, this determination can include the cellular network 102 (e.g., the BSC 114) comparing the values of the cellular measurements of the cellular measurement reports 220 received from the UE 106 to the cellular measurements that were acquired by the UE 106 (or one or more other UEs 106) while it was in range of the wireless network 104 (e.g., the cellular measurements that were received in the wireless/cellular reports 220 received from the UE 106 (or one or more other UEs 106) while it was connected to an AP 120 of a wireless network 104). The cellular network 102 (e.g., the BSC 114) may determine that the UE 106 is proximate to an AP 120 of a wireless network 104 if the most recent cellular measurements report 220 received from the UE 106 includes cellular measurements that match (e.g., are within a threshold range) of one or more cellular measurements associated with the wireless network 104. If the cellular network 102 (e.g., the BSC 114) determines that the cellular measurements of a measurement report 220 received from a UE 106 do not match (e.g., do not fall within the range of) the cellular measurements associated with any wireless networks 104 (e.g., including those associated with the wireless networks 104a, 104b and so forth), then the cellular network 102 (e.g., the BSC 114) may determine that the UE 106 is not proximate to (e.g., within range of) a wireless network 104. If it is determined that the UE 106 is not proximate to a wireless network 104, then the cellular network 102 may continue to monitor the cellular measurement reports 220 received from the UE 106 to determine whether the UE 106 is proximate to a wireless network 104.

In some embodiments, the method 600 can include receiving a handover message (block 622). Receiving a handover message can include the UE 106 receiving a handover message 228 generated by and transmitted from the cellular network 102 (e.g., generated by and transmitted from the BSC 114). For example, if the cellular network 102 (e.g., the BSC 114) determines that the UE 106 is proximate to the Guest wireless network 104a, then the cellular network 102 (e.g., the BSC 114) may transmit a handover message 228 commanding the UE 106 to attempt to connect to the Guest wireless network 104a and/or other wireless networks 104.

In some embodiments, the method 600 can include scanning for a wireless network (block 624). Scanning for a wireless network can include the UE 106 scanning for a wireless network 104 indicated in the handover message 228 and/or one or more other wireless networks 104. For example, in response to the UE 106 receiving the handover message 228, the UE 106 may conduct a wireless network scan for the Guest wireless network 104a and/or other wireless networks 104.

In some embodiments, the method 600 can include connecting to a wireless network (block 626). Connecting to a wireless network can include the UE 106 connecting to a wireless network identified during the scan for a wireless network. For example, the UE 106 may establish a connection with the second AP 120b of the Guest wireless network 104a and, thus, establishes a connection with the Guest wireless network 104a as a result of the wireless network scan.

In some embodiments, the method 600 can include transmitting a handover complete message (block 628). Transmitting a handover complete message can include the UE 106 generating and transmitting to the cellular network 102 (e.g., to the BSC 114) a handover complete message 234 that indicates a successful connection to a wireless network 104. For example, if the UE 106 establishes a connection with the second AP 120b of the Guest wireless network 104a and, thus, establishes a connection with the Guest wireless network 104a, then the UE 106 may generate and transmit to the cellular network 102 (e.g., to the BSC 114) a handover complete message 234 that indicates the UE 106 has successfully connected to the Guest wireless network 104a.

Figure 7:
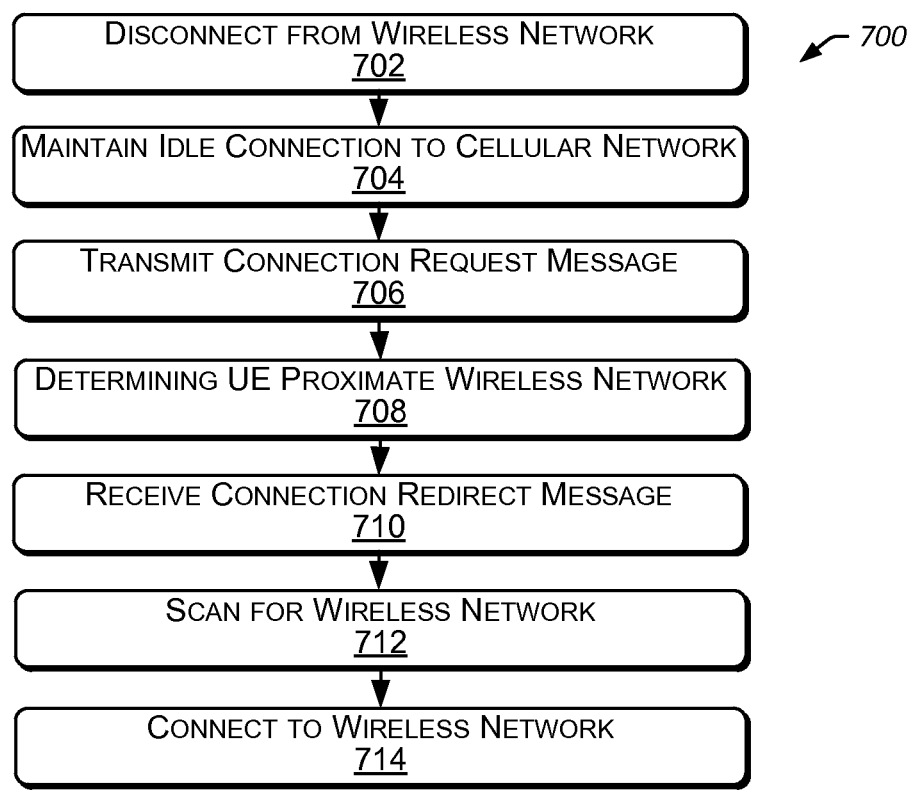

FIG. 7 is a flowchart that illustrates an example method 700 for managing connection of a device (e.g., a UE 106) to networks (e.g., a wireless network 104 and a cellular network 102) in accordance with one or more embodiments. Some or all of the described operations of method 700 may be carried out by the UE 106 and/or the cellular network 102 (e.g., the BSC 114 of the cellular network 102).

In some embodiments, the method 700 can include disconnecting from a wireless network (block 702). Disconnecting from a wireless network can include breaking a previously established wireless connection between a UE 106 and a wireless network 104. For example, a UE 106 may intentionally disconnect from the first AP 120a of the Guest wireless network 104a (e.g., in response to the user 108 requesting to terminate the connection to the Guest wireless network 104a), the AP 120a may intentionally disconnect the UE 106 from the AP 120a and the Guest wireless network 104a, and/or the UE 106 may simply lose the wireless connection as a result of a poor wireless signal, such as that caused by the user 108 moving the UE 106 out of range of the AP 120a.

In some embodiments, the method 700 can include maintaining an idle connection with a wireless network (block 704). Maintaining an idle connection with a wireless network can include the UE 106 establishing and/or maintaining an idle connection with the cellular network 102. For example, the UE 106 may establish an idle connection with the first base station 112a of the cellular network 102.

In some embodiments, the method 700 can include transmitting a connection request message (block 706). Transmitting a connection request message can include the UE 106 generating and transmitting to the cellular network 102 (e.g., to the BSC 114) a connection request message 306 including a request to establish an active connection between the UE 106 and the cellular network 102. A connection request message 306 may include an RRC connection requests including a cause, SCELL measurements, and NCELL measurements. For example, the UE 106 may generate and transmit to the cellular network 102 a RRC connection requests message including a cause of "originatingStreamingCall;" SCELL measurements including: (a) an ID of "EUTRAN cell PCI 100"; (b) a RSRP=−90 dBm; and (c) RSRQ=−20 dB; and NCELL measurements including: (a) an ID of "EUTRAN cell PCI 200"; (b) RSRP=−100 dBm; and (c) RSRQ=−24 dB.

In some embodiments, the method 700 can include determining that the UE is proximate to a wireless network (block 708). Determining that the UE is proximate to a wireless network 104 can include the cellular network 102 (e.g., the BSC 114) determining whether the UE 106 is proximate to a wireless network based on a comparison of the cellular measurements received from the UE 106 to the cellular measurements logged by the cellular network 104. For example, in response to a connection request message 306 from the UE 106, the cellular network 102 (e.g., the BSC 114) may compare the cellular measurements in the connection request message 306 received from the UE 106 to logged cellular measurements to determine whether the UE 106 is proximate to an AP 120 of a wireless network 104. The cellular network 102 (e.g., the BSC 114) may determine that the UE 106 is proximate to an AP 120 of a wireless network 104 if the cellular measurements in the connection request message 306 received from the UE 106 include cellular measurements that match (e.g., are within a threshold range) of one or more cellular measurements associated with the wireless network 104. If the cellular network 102 (e.g., the BSC 114) determines that the cellular measurements of the connection request message 306 received from a UE 106 do not match (e.g., do not fall within the range of) the cellular measurements associated with any wireless networks 104 (e.g., including those associated with the wireless networks 104a, 104b and so forth), then the cellular network 102 (e.g., the BSC 114) may determine that the UE 106 is not proximate to (e.g., within range of) a wireless network 104. If it is determined that the UE 106 is not proximate to a wireless network 104, then the cellular network 102 may continue to monitor the cellular measurement reports 220 received from the UE 106 to determine whether the UE 106 is proximate to a wireless network 104.

If it is determined that the UE 106 is not proximate to a wireless network 104, then the cellular network 102 (e.g., the BSC 114) may establish a cellular connection with the UE 106. For example, the cellular network 102 (e.g., the BSC 114) may establish the requested cellular connection, and enable the UE 106 to exchange data via the cellular network 102 such that the "cause" can be served via the cellular network 102.

In some embodiments, the method 700 can include receiving a connection redirect message (block 710). Receiving a connection redirect message can include the UE 106 receiving a connection redirect message 310 generated by and transmitted from the cellular network 102 (e.g., from the BSC 114). If it is determined that the UE 106 is proximate to a wireless network 104, then the cellular network 102 (e.g., the BSC 114) may generate a connection redirect message 310 and transmit the connection redirect message 310 to the UE 106. For example, if the cellular network 102 (e.g., the BSC 114) determines that the UE 106 is proximate to the Guest wireless network 104a, then the cellular network 102 (e.g., the BSC 114) may transmit a connection redirect message 310 commanding the UE 106 to attempt to connect to the Guest wireless network 104a and/or other wireless networks 104.

In some embodiments, the method 700 can include scanning for a wireless network (block 712). Scanning for a wireless network can include the UE 106 scanning for a wireless network 104 indicated in the connection redirect message 310 and/or one or more other wireless networks 104. For example, in response to the UE 106 receiving the connection redirect message 310, the UE 106 may conduct a wireless network scan for the Guest wireless network 104a and/or other wireless networks 104.

In some embodiments, the method 700 can include connecting to a wireless network (block 714). Connecting to a wireless network can include the UE 106 connecting to a wireless network identified during the scan for a wireless network. For example, the UE 106 may establish a connection with the second AP 120b of the Guest wireless network 104a and, thus, establishes a connection with the Guest wireless network 104a as a result of the scan for a wireless network.

It will be appreciated that the processes and methods described herein are example embodiments of processes and methods that may be employed in accordance with the techniques described herein. The processes and methods may be modified to facilitate variations of their implementation and use. The order of the processes and methods and the operations provided therein may be changed, and various elements may be added, reordered, combined, omitted, modified, etc. Portions of the processes and methods may be implemented in software, hardware, or a combination thereof. Some or all of the portions of the processes and methods may be implemented by one or more of the processors/modules/applications described herein.

Figure 8:
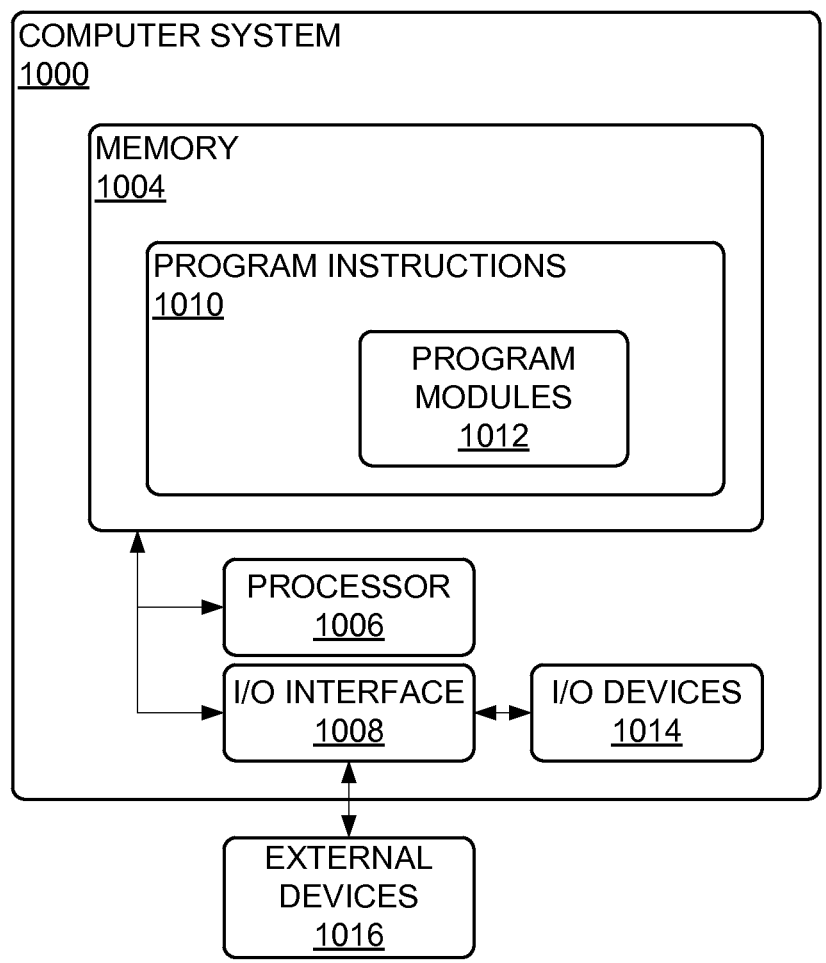
FIG. 8 is a diagram that illustrates an example computer system in accordance with one or more embodiments.

FIG. 8 is a diagram that illustrates an example computer system 1000 in accordance with one or more embodiments. In some embodiments, the computer system 1000 may include a memory 1004, a processor 1006, and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), bulk storage memory (e.g., CD-ROM and/or DVD-ROM, hard drives), and/or the like. The memory 1004 may include a non-transitory computer-readable storage medium having program instructions 1010 stored therein. The program instructions 1010 may include program modules 1012 that are executable by a computer processor (e.g., the processor 1006) to cause the functional operations described herein, including those described with regard to the processes 200, 400, and 500, and the methods 600 and 700. In the context of a computer system of a UE 106, the program modules 1012 may include a UE module for performing some or all of the operations described with regard to the UE 106. In the context of a computer system of a cellular network 102, such as the RBS 112 and/or the BSC 114, the program modules 1012 may include a cellular network module executed by the RBS 112 and/or the BSC 114 for performing some or all of the operations described with regard to the entities of the cellular network 102, such as the operations described with regard to the cellular network 102 generally, the RBS 112, and/or the BSC 114. In the context of a computer system of a wireless network 102, the program modules 1012 may include a wireless network module for performing some or all of the operations described with regard to the entities of the wireless network 102, such as the operations described with regard to the of the access points 120.

The processor 1006 may be any suitable processor capable of executing/performing program instructions. The processor 1006 may include a central processing unit (CPU) that carries out program instructions (e.g., the program instructions of the program module(s) 1012) to perform the arithmetical, logical, and input/output operations described herein. The processor 1006 may include one or more processors. The I/O interface 1008 may provide an interface for communication with one or more I/O devices 1014, such as a joystick, a computer mouse, a keyboard, a display screen (e.g., an electronic display for displaying a graphical user interface (GUI)), and/or the like. The I/O devices 1014 may include one or more of the user input devices. The I/O devices 1014 may be connected to the I/O interface 1008 via a wired or a wireless connection. The I/O interface 1008 may provide an interface for communication with one or more external devices 1016, such as other computers, networks, and/or the like. In some embodiments, the I/O interface 1008 may include an antenna, transceiver, and/or the like.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features of the embodiments may be utilized independently, all as would be apparent to one skilled in the art after having the benefit of this description of the embodiments. Changes may be made in the elements described herein without departing from the spirit and scope of the embodiments as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the phrase "based on" does not limit the associated operation to being solely based on a particular item. Thus, for example, processing "based on" data A may include processing based at least in part on data A and based at least in part on data B unless the content clearly indicates otherwise. As used throughout this application, the term "from" does not limit the associated operation to being directly from. Thus, for example, receiving an item "from" an entity may include receiving an item directly from the entity or indirectly from the entity (e.g., via an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. A method for managing network connections of a cellular phone device, the method comprising:
   receiving, from a cellular radio access network (RAN), a radio resource control (RRC) connection reconfiguration message, wherein the RRC connection reconfiguration message comprises a set of radio bearer (RB) setup parameters;
   establishing a connection with a base station of the cellular RAN in accordance with the set of RB setup parameters;
   determining that the cellular phone device is connected to a WiFi access point (AP);
   transmitting, to the cellular RAN, a RRC connection reconfiguration complete message, wherein the RRC connection reconfiguration complete message comprises:
      a WiFi connection status indicating that the cellular phone is connected to the WiFi AP;
      a WiFi service set identifier (SSID) identifying the WiFi AP;
      a WiFi received signal strength indicator (RSSI) indicative of a strength of a radio signal connecting the cellular phone device and the WiFi AP;
   receiving, from the cellular RAN, a RRC cellular measurement message, wherein the RRC cellular measurement message comprises a set of cellular measurement parameters specifying the following to be acquired for each of one or more cellular signals received by the cellular phone device:
      an identifier of the cell from which the cellular signal originates;
      a reference signal received power (RSRP) of the cellular signal; and
      a reference signal received quality (RSRQ) of the cellular signal;
   receiving, from the cellular RAN, a RRC WiFi measurement message, wherein the RRC WiFi measurement message comprises a set of WiFi measurement parameters specifying the following to be acquired for each of one or more WiFi signals received by the cellular phone:
      a service set identifier (SSID) of the corresponding wireless network;
      a basic service set identifier (BSSID) of the corresponding wireless network; and
      a received signal strength indicator (RSSI) for the WiFi signal;
   determining, by the cellular phone device, cellular measurements in accordance with the set of cellular measurement parameters, wherein the cellular measurements indicate a strength of one or more cellular signals received by the cellular phone device from one or more radio base stations of the cellular RAN;

transmitting, to the cellular RAN, a cellular measurement report, wherein the cellular measurement report comprises the cellular measurements;

determining, by the cellular phone device, WiFi measurements in accordance with the set of WiFi measurement parameters, wherein the WiFi measurements indicate one or more wireless networks in range of the cellular phone device; and transmitting, to the cellular RAN, a WiFi measurement report, wherein the WiFi measurement report comprises the WiFi measurements;

determining, by the cellular RAN, whether a second cellular device that is not connected to the WiFi network is proximate to the WiFi AP using the cellular measurements and the cellular and the WiFi measurements; and transmitting, by the cellular RAN in response to determining that the second cellular device is proximate to the WiFi AP, a redirect message to the second cellular device instructing the second cellular device to attempt to connect to the WiFi network.

2. The method of claim 1, further comprising:

determining, after determining that the cellular phone is connected to the WiFi AP, that the cellular phone is not connected to the WiFi AP;

transmitting, to the cellular RAN, an indication that the cellular phone is not connected to the WiFi AP;

transmitting, to the cellular RAN, a post-disconnect cellular measurement report, wherein the post-disconnect cellular measurement report comprises the cellular measurements acquired while the cellular phone is not connected to the WiFi AP;

receiving, from the cellular RAN, a target handover message, wherein the target handover message indicates an available WiFi AP, and wherein the available WiFi AP is determined by the cellular RAN by comparing the cellular measurements of the post-disconnect cellular measurement report to cellular measurements of one or more cellular measurement reports transmitted to the cellular RAN;

establishing a connection with the available WiFi AP;

transmitting, to the cellular RAN, a handover message indicating that the cellular phone has connected to the available WiFi AP; and transmitting or receiving data via the connection to the WiFi AP.

3. The method of claim 1, wherein the WiFi measurement report comprises:

an identification of the WiFi AP;

wireless measurements indicative of a strength of a signal from the WiFi AP;

an identification of one or more other WiFi APs;

wireless measurements indicative of the strength of signals from the one or more other WiFi APs;

serving cell (SCELL) measurements indicative of a strength of a cellular signal from a serving cell; and neighbor cell (NCELL) measurements indicative of a strength of a cellular signal from a cell neighboring the serving cell.

4. The method of claim 1, further comprising:

determining that the cellular phone does not have an active data connection with the cellular RAN;

transmitting, to the cellular RAN, an RRC connection request for a data connection, wherein the RRC connection request comprises:

serving cell (SCELL) measurements indicative of a strength of a cellular signal from a serving cell; and neighbor cell (NCELL) measurements indicative of a strength of a cellular signal from a cell neighboring the serving cell;

receiving, from the cellular RAN, a RRC connection redirect message, wherein the RRC connection redirect message indicates an available WiFi AP; and connecting to the available WiFi AP.

5. A method comprising:

establishing, by a user device, a connection with a cellular network;

transmitting, by the user device to a cellular network server, a first message comprising an indication of a connection to a wireless network;

receiving, by the user device from the cellular network server, a second message comprising wireless network measurement parameters;

determining, by the user device and based at least in part on the second message, wireless network measurements in accordance with the wireless network measurement parameters; and transmitting, by the user device to the cellular network server, a wireless network measurement report comprising an indication of the wireless network measurements, wherein the cellular network server is configured to determine whether a cellular device is proximate to an access point for the wireless network using the wireless network measurements.

6. The method of claim 5, wherein the first message comprises:

a connection identifier indicating an identity of the wireless network;

a received signal strength indicator (RSSI) value indicative of a connection strength between the user device and the wireless network.

7. The method of claim 5, wherein the wireless network measurement parameters specify one of:

one or more times at which a measurement report is to be transmitted by the user device to the cellular network server;

one or more reporting trigger events, wherein a measurement report is to be transmitted by the user device to the cellular network server in response to determining an occurrence of a reporting trigger event; or a frequency at which a measurement report is to be transmitted by the user device to the cellular network server.

8. The method of claim 5, further comprising:

determining, by the user device, that the connection to the wireless network is lost; and transmitting, by the user device to the cellular network server, the wireless network measurement report.

9. The method of claim 5, further comprising:

determining that the connection to the wireless network is lost;

transmitting, by the user device to the cellular network server, a third message indicating that the connection to the wireless network is lost;

receiving, by the user device from the cellular network server, a handover message indicating a second wireless network determined to be within range of the user device; and establishing a connection with the second wireless network.

10. The method of claim 5, further comprising:

losing the connection of the user device with the wireless network server;

receiving, by the user device from the cellular network, a handover message indicating that a second wireless network is within range of the user device; and establishing, by the user device, a connection with the second wireless network.

11. The method of claim 5, further comprising:
receiving, by the user device from the cellular network server, a cellular measurement message comprising cellular network measurement parameters;
determining, by the user device, cellular network measurements in accordance with the cellular network measurement parameters; and
transmitting, by the user device to the cellular network server, a cellular network measurement report comprising an indication of the cellular network measurements.

12. The method of claim 5, wherein the wireless network measurement report comprises:
an identification of a wireless network access point;
wireless measurements indicative of a strength of a signal from the wireless network access point;
serving cell (SCELL) measurements indicative of a strength of a cellular signal from a serving cell; and
neighbor cell (NCELL) measurements indicative of a strength of a cellular signal from a cell neighboring the serving cell.

13. The method of claim 5, wherein the wireless network comprises a WiFi network, the method further comprising:
receiving, by the user device from the cellular network server, a handover message indicating that a second WiFi network is within range of the user device;
scanning, by the user device, for the second WiFi network; and
establishing, by the user device, a connection with an access point (AP) of the second WiFi network.

14. A system, comprising:
a processor; and
a memory comprising program instructions stored thereon that are executable by the processor to cause:
establishing a cellular connection with a user device;
receiving, from the user device, an indication of a connection of the user device to a wireless network;
transmitting, to the user device, wireless network measurement parameters;
receiving, from the user device, an indication of wireless network measurements acquired in accordance with the network measurement parameters;
determining an available wireless network using the wireless network measurements; and
transmitting, to the user device, information about the available wireless network.

15. The system of claim 14, wherein the indication of the connection of the user device to the wireless network comprises:

an indication of a connection status between the user device and the wireless network;
a connection identifier indicating an identity of the wireless network;
a received signal strength indicator (RSSI) value indicative of a connection strength between the user device and the wireless network.

16. The system of claim 14, wherein the wireless network measurement parameters specify at least one of:
one or more times at which a measurement report is to be transmitted by the user device to a cellular network server;
one or more reporting trigger events, wherein a measurement report is to be transmitted by the user device to the cellular network server in response to determining an occurrence of a reporting trigger event; or
a frequency at which a measurement report is to be transmitted by the user device to the cellular network server.

17. The system of claim 14, wherein the program instructions are further executable by the processor to cause:
receiving, from the user device, an indication that the connection of the user device to the wireless network is lost, and
wherein the information about the available wireless network is transmitted to the user device at least partially in response to receiving the indication that the connection of the user device to the wireless network is lost.

18. The system of claim 14, wherein the wireless network measurement report comprises:
an identification of a wireless network access point;
wireless measurements indicative of a strength of a signal from the wireless network access point;
serving cell (SCELL) measurements indicative of a strength of a cellular signal from a serving cell; and
neighbor cell (NCELL) measurements indicative of a strength of a cellular signal from a cell neighboring the serving cell.

19. The system of claim 18, wherein determining the available wireless network using the wireless network measurement report comprises:
determining a location of the user device using the SCELL measurements or the NCELL measurements; and
determining that the available wireless network is proximate to the location of the user device.

20. The system of claim 14, wherein the program instructions are further executable by the processor to cause:
transmitting, to the user device, cellular network measurement parameters; and
receiving, from the user device, cellular network measurements acquired in accordance with the cellular network measurement parameters,
wherein the available wireless network is determined using the cellular network measurements.

* * * * *